United States Patent Office 3,592,875
Patented July 13, 1971

3,592,875
MOULDING COMPOSITIONS CONTAINING THERMOPLASTIC POLYESTERS
Ludwig Brinkmann and Walter Herwig, Frankfurt am Main, and Klaus-Dieter Asmus, Hofheim, Taunus, Germany, assignors to Farbwerke Hoechst Aktiengesellschaft vormals Meister Lucius & Bruning, Frankfurt am Main, Germany
No Drawing. Filed Mar. 3, 1969, Ser. No. 804,022
Claims priority, application Germany, Mar. 23, 1968, P 17 70 043.5
Int. Cl. C08g 17/06, 39/10
U.S. Cl. 260—873
10 Claims

ABSTRACT OF THE DISCLOSURE

Polyesters of aromatic dicarboxylic acids, saturated aliphatic or cycloaliphatic diols and alcohols containing more than two hydroxymethyl groups bound to a cyclohexane ring or tetrahydropyran ring. The said polyesters are used for making injection moulded articles that are free from flash formation.

---

The present invention relates to moulding compositions containing thermoplastic polyesters which, when being processed by injection moulding, exhibit especially favorable properties.

It has been proposed to produce crystalline shaped articles by injection moulding polyesters of aromatic dicarboxylic acids and aliphatic or cycloaliphatic diols. To improve the crystallization speed substances which promote crystallization are added to the polyesters. In general, the polyester moulding compositions are injected into heated moulds.

In British Pat. No. 1,104,089 it has been described, for example, that inorganic substances that are insoluble in the polyester melt, such as calcium carbonate, calcium sulfate or titanium dioxide and have a particle size of less than 2 microns, accelerate the crystallization of the polyester composition. The inorganic substances are added to the polyesters in an amount of from 0.05 to 0.5% by weight. The addition ensures that at a sufficiently high temperature of the mould the polyester reaches an optimum degree of crystallization during moulding so that alterations of shape and dimension after-crystallization are practically excluded.

It has also been proposed to incorporate polyols having more than two hydroxyl groups into fiber-forming polyesters. By this step the period of time required to obtain high molecular weights is shortened and the mechanical properties of the fibers are improved. For the manufacture of films and coatings polyesters are being used which are produced from terephthalic acid, ethylene glycol and an at least trihydric alcohol. Films made from polyesters of this type are still flexible and not crystalline after heating for one hour at 220° C.

Moulded articles made from the polyester moulding compositions are predominantly used for industrial purposes, for example for the manufacture of gear wheels, pivot bearings and disk cams. They have to meet high standards with regard to their mechanical properties and, moreover, they should have an especially good surface quality, fill the mould completely, have a high dimensional stability and be free from flash formation. The surface properties of the moulded articles can be manipulated in various ways, by adding a lubricant, or suitably adjusting the injection conditions of the injection moulding machine. Although the conditions of injection moulding can be varied within very wide limits, it is very difficult to avoid flash formation with injection moulded polyethylene terephthalate. The method usually employed in injection moulding, i.e. to regulate the pressure during dwell time in such a manner that the mould is completely filled but the moulded article remains free from flash formation, is often unsatisfactory. With a complete mould charge it is, therefore, necessary in most cases to subject the moulded article to a mechanical after-treatment after removal from the mould.

It has now been found that polyester obtained by polycondensation of (a) aromatic dicarboxylic acids and optionally small amounts of aliphatic dicarboxylic acids, and
(b) saturated aliphatic or cycloaliphatic diols by a known method have especially favorable properties when the polycondensation is carried out in the presence of
(c) alcohols containing more than 2 hydroxymethyl groups bound to a cyclohexane ring or a tetrahydropyran ring in an amount of from 0.01 to 2% by weight, preferably 0.03 to 0.5% by weight, calculated on the weight of the polyester.

The polyesters produced in this manner have a reduced specific viscosity of from 0.6 to 2.4 dl./g., measured with a 1% solution in a 60:40 mixture of phenol and tetrachloroethane at 25° C. The polyesters obtained are especially suitable for injection moulding.

Polyesters of the compositions specified above have not yet been described in literature. When injection moulded articles are made therefrom they are surprisingly free from flash formation. Moreover, the shaped articles made from the compositions of the invention have remarkably good mould release properties and excellent surface properties even with short dwell times.

As dicarboxylic acid in the polyester moulding compositions of the invention terephthalic acid is suitable in the first place. In addition to terephthalic acid units, the polyesters may contain up to 5 mole percent of units of other aromatic or aliphatic dicarboxylic acids, for example isophthalic acid, diphenyl-4,4'-dicarboxylic acid, naphthalene-2,6-dicarboxylic acid or adipic acid.

As diol component ethylene glycol is especially suitable. It is likewise suitable, however, to use 1,4-bis-hydroxymethylcyclohexane. Besides ethylene glycol or 1,4-bis-hydroxymethyl-cyclohexane, up to 10 mole percent of other aliphatic diols, for example 2,2-dimethyl-propane-diol-(1,3) or butane-diol-(1,4) may be contained in the polyester.

Suitable alcohols having more than two hydroxymethyl groups bound to a cyclohexane ring or a tetrahydropyran ring—which are referred to in the following as polyols—are, for example, 1,1,3,3-tetrakis-hydroxymethyl-cyclohexane and tetrahydro-3,3,5,5-tetrakis-(hydroxymethyl)-pyran. The polyols may additionally contain a secondary hydroxyl group, such as, for example 2,2,6,6-tetrakis-hydroxymethyl-cyclohexanol-1 or tetrahydro-3, 3,5,5-tetrakis-(hydroxymethyl)-4-hydroxy - pyran. Especially good results are obtained with 1,1,4,4-tetrakis-hydroxymethyl-cyclohexane. The polyols are used either individually or in admixture with one another.

The polyesters are prepared in known manner, for example by reacting diesters of the dicarboxylic acids and low molecular weight aliphatic alcohols with the diol and the polyol. The polyol can be added at different stages of the manufacturing process of the polyester. It may be reacted with the diester of the dicarboxylic acid together with the diol. Alternatively, the polyol may be added to the reaction mixture after termination of the ester interchange reaction, whereupon the polyester is prepared by polycondensation in known manner.

Ester interchange reaction and polycondensation are accelerated in known manner by adding small amounts of catalysts.

The thermoplastic moulding compositions according to the invention contain polyesters having a reduced specific viscosity in the range of from 0.6 to 2.4 dl/g., preferably 1.0 to 1.7 dl/g., measured with 1% solutions in 60:40 mixtures of phenol and tetrachloroethane at 25° C. To produce polyesters having high reduced specific viscosities the polyesters obtained by polycondensation in the melt are subjected to a post-condensation in the solid phase in known manner.

The polyol-modified polyesters of the invention may also be components of thermoplastic moulding compositions containing besides the polyester, up to 20% by weight, preferably up to 10% by weight of polymers, for example copolymers of ethylene and acrylic acid ester or of butadiene and styrene, which improve the impact strength of the polyesters.

It is suitable to add to the polyester a crystallization promoting agent, for example an inorganic nucleating agent such as kaolin, talc or an alkaline earth metal carbonate. The inorganic nucleating agents should preferably have a particle size below 2 microns. It is likewise possible to add to the polyester organic crystallization promoting agents, for example ionic copolymers of ethylene and acrylic acid containing sodium ions as cations. The crystallization promoting substances can be incorporated into the polyester composition in various ways. The crystallization promoting agent and the polyester can be mixed, for example, by intensely stirring in the molten state. It is advantageous to mix as uniform as possible the granulated or powdered polyester with the powdery crystallization promoting substance, to melt the mixture in an extruder and to granulate it after cooling.

In order to obtain unobjectionable injection moulded articles the polyester moulding composition should contain as little moisture as possible, preferably at most 0.01% by weight. For this purpose the granulated polyester moulding composition may be coated with an inert hydrophobic substance, for example a wax or paraffin.

To produce shaped articles having a good degree of crystallization the temperature of the mould should be sufficiently above the second order transition temperature of the polyester. In the case of polyester moulding compositions on the basis of a modified polyethylene terephthalate mould temperatures in the range of from 120 to 150° C. are preferred.

The following examples serve to illustrate the invention but they are not intended to limit it thereto.

EXAMPLE 1

(a) A mixture of 35 kilograms of terephthalic acid dimethyl ester, 27 kilograms of ethylene glycol and 8.8 grams of manganese acetate(tetrahydrate) was heated to 175° C. whilst stirring. During the course of 4 hours the temperature was raised to 230° C. and the mixture was stirred until no more methanol distilled over. 59.5 grams of 1,1,4,4-tetrakis-hydroxymethyl-cyclohexane were then added and the melt was stirred for 15 minutes. Next 2.34 grams of phosphorous acid were added, the melt was again stirred for 15 minutes and 12.7 grams of germanium phosphite were added. During the course of 150 minutes the temperature of the melt was raised to 275° C. and the pressure was reduced to 0.2 mm. of mercury. The melt was stirred for 4 hours under these temperature and pressure conditions. A colorless polyester having a reduced specific viscosity of 0.88 dl/g., measured with a 1% solution in a 60:40 mixture of phenol and tetrachloroethane at 25° C., was obtained.

The granulated polyester was dried for 5 hours at 180° C. under reduced pressure in an eccentric tumbling drier, subjected to rotation at room temperature together with 0.4% by weight of powdery aluminum silicate (47% $SiO_2$, 38% $Al_2O_3$; 75% having a particle size of less than 2 microns), the mixture was homogenized in an extruder, granulated and then dried for 2 hours at 100° C. under reduced pressure of 0.4 mm. of mercury in an eccentric tumbling drier. The granules were subjected to an after-condensation in the solid phase. The after-condensed polyester had a reduced specific viscosity of 1.52 dl/g. The granules were coated with 0.2% by weight of polyethylene wax.

Sheets of dimensions 60 x 60 x 2 mm. were injection moulded with the polyester composition at a temperature of the mould of 150° C. The sheets were injection moulded under different pressures, the pressures during dwell time being varied from 70 to 140 atmospheres gauge. In each case, the dwell time was 15 seconds. All sheets obtained were free from flash formation.

(b) In a comparative experiment a polyester was prepared as described above with the exception that no 1,1,4,4-tetrakis-hydroxymethyl-cyclohexane was added prior to polycondensation. When the composition was injection moulded noticeable flash formation was already observed under a pressure during dwell time of 70 atmospheres gauge, which flash formation considerably increased with increasing pressure and was very pronounced under a pressure above 100 atmospheres gauge (cf. the following table).

EXAMPLES 2-3

Two modified polyethylene terephthalates were prepared as described in Example 1 containing (3) 0.113% by weight and (4) 0.057% by weight of 1,1,4,4-tetrakis-hydroxymethyl-cyclohexane. The polyesters were further treated as described in Example 1. The results obtained are summarized in the following table. Polyethylene terephthalate modified with 0.113% by weight of 1,1,4,4-tetrakis-hydroxymethyl-cyclohexane could be injection moulded into sheets which were free from flash formation even under a pressure during dwell time of 140 atmospheres gauge. When the polyester contained only 0.057% by weight of 1,1,4,4-tetrakis-hydroxymethyl-cyclohexane flash formation could not be fully avoided under a pressure of 110 atmospheres gauge.

Referring to the table:

TABLE

| Example No. | Polyethylene terephthalate (1) modified with— | Specific viscosity Before injection moulding | Specific viscosity After injection moulding | Pressure | Mould charge (2) | Flash (3) |
|---|---|---|---|---|---|---|
| 1(a) | 0.17 by weight 1,1,4,4-tetra-kis-hydroxymethyl-cyclo-hexane. | 1.52 | 1.47 | 70 | F− | − |
| | | | | 90 | F+ | − |
| | | | | 110 | F+ | − |
| | | | | 130 | F+ | − |
| | | | | 140 | F+ | − |
| 1(b) | Not modified | 1.41 | 1.35 | 70 | F+ | + |
| | | | | 90 | F+ | + |
| | | | | 110 | F+ | ++ |
| | | | | 130 | F+ | ++ |
| | | | | 140 | F+ | ++ |
| 2 | 0.113% by weight 1,1,4,4-tetra-kis-hydroxymethyl-cyclohexane. | 1.42 | 1.35 | 70 | F+ | − |
| | | | | 90 | F+ | − |
| | | | | 110 | F+ | − |
| | | | | 130 | F+ | − |
| | | | | 140 | F+ | − |
| 3 | 0.057% by weight 1,1,4,4-tetra-kis-hydroxymethyl-cyclohexane. | 1.47 | 1.40 | 70 | F+ | − |
| | | | | 90 | F+ | − |
| | | | | 110 | F+ | − |
| | | | | 130 | F+ | + |
| | | | | 140 | F+ | + |

(1)

The polyesters contained as nucleating agent 0.4% by weight of aluminum silicate powder (47% $SiO_2$, 38% $Al_2O_3$, 75% of particles below 2 microns. The polyester granules were coated with 0.2% by weight of polyethylene wax.

(2)

Unobjectionable mould charge _____ MC+
Objectionable mould charge _____ MC−

(3)

Flash higher than 4 mm. _____ ++
Flash 1 to 2 mm. _____ +
No flash _____ −

What is claimed is:

1. Polyester obtained by polycondensation of
   (a) terephthalic acid,
   (b) ethylene glycol or 1,4-hydroxymethyl-cyclohexane and
   (c) from 0.01 to 2% by weight, calculated on the weight of the polyester, of one or more polyols selected from the group consisting of 1,1,3,3 - tetrakis - hydroxymethyl - cyclohexane, tetrahydro - 3,3,5,5 - tetrakis - hydroxymethyl - pyran, 2,2,6,6 - tetrakis - cyclohexanol-1, tetrahydro - 3,3,5,5 - tetrakis - hydroxymethyl - 4 - hydroxypyran and 1,1,4,4-tetrakis - hydroxymethyl - cyclohexane, said polyester having a reduced specific viscosity of from 0.6 to 2.4 dl/g., measured with a 1% solution in a 60:40 mixture of phenol tetrachloroethane at 25° C.

2. A thermoplastic molding composition containing, in addition to the polyester defined in claim 1, up to 20% by weight of a copolymer of ethylene and an acrylic acid ester or a copolymer of butadiene and styrene.

3. A method of making a polyester which comprises polycondensing (a) terephthalic acid, (b) ethylene glycol or 1,4 - bis - hydroxene ethyl - cyclohexane, and (c) 0.01 to 2% by weight of one or more polyols selected from the group consisting of 1,1,3,3 - tetrakis - hydroxymethyl-cyclohexane, tetrahydro - 3,3,5,5 - tetrakis - hydroxymethyl - pyran, 2,2,6,6 - tetrakis - hydroxymethyl - cyclohexanol, tetrahydro - 3,3,5,5 - tetrakis - hydroxymethyl-4 - hydroxy - pyran and 1,1,4,4 - tetrakis-hydroxymethyl-cyclohexane.

4. A polyester as claimed in claim 1, wherein component (a) contains up to 5 mole percent of an acid selected from the group consisting of isophthalic acid, diphenyl - 4',4' - dicarboxylic acid, naphthalene - 2,6-dicarboxylic acid and adipic acid.

5. A polyester as claimed in claim 1, wherein component (b) is ethylene glycol.

6. A polyester as claimed in claim 1, wherein component (b) is 1,4-bis-hydroxymethyl-cyclohexane.

7. A polyester as claimed in claim 1, wherein component (b) contains up to 10 mole percent of an aliphatic diol selected from the group of 2,2-dimethylpropane-diol-(1,3) and butane-diol-(1,4).

8. A polyester as claimed in claim 1, wherein component (c) is a mixture of at least two polyols.

9. A polyester as claimed in claim 1, having a reduced specific viscosity of from 1.0 to 1.7 dl/g.

10. Shaped articles made from the polyesters of claim 1.

References Cited

UNITED STATES PATENTS 3,216,973  11/1965  Britain _____ 260—2.5
3,414,527  12/1968  Sikora _____ 260—860
3,441,573   4/1969  Fahnenstich et al. ___ 260—860
3,467,719   9/1969  Thompson _____ 260—860

WILLIAM H. SHORT, Primary Examiner
E. WOODBERRY, Assistant Examiner

U.S. Cl. X.R.
260—75